United States Patent [19]

Quate

[11] 3,824,586

[45] July 16, 1974

[54] METHOD OF AND APPARATUS FOR ANALOG TO DIGITAL CONVERSION UTILIZING ACOUSTIC WAVES

[75] Inventor: Calvin F. Quate, Los Altos Hills, Calif.

[73] Assignee: The Board of Trustees of Leland Stanford Junior University, Stanford, Calif.

[22] Filed: Sept. 7, 1972

[21] Appl. No.: 286,928

[52] U.S. Cl. ........... 340/347 AD, 324/83 D, 328/14

[51] Int. Cl. ...................... H03d 13/00, H03k 13/02

[58] Field of Search.... 340/347 AD, 16; 313/108 A; 328/14; 324/83 D

[56] References Cited

UNITED STATES PATENTS

| | | | |
|---|---|---|---|
| 3,035,200 | 5/1962 | Yando | 313/108 A |
| 3,072,821 | 1/1963 | Yando | 313/108 A |
| 3,134,099 | 5/1964 | Woo | 340/347 AD |
| 3,653,031 | 3/1972 | Hlady | 340/347 AD |

*Primary Examiner*—Thomas J. Sloyan
*Attorney, Agent, or Firm*—Paul B. Fihe

[57] ABSTRACT

An analog to digital conversion system wherein a sequence of correlated electromagnetic reference pulses and sampling pulses are generated, the individual sampling pulses each being time-delayed an amount determined by the instantaneous value of an analog signal. The reference and time-delayed sampling pulses are then applied to a piezoelectric medium to generate acoustic waves in a fashion such that translation of the two waves occurs and interaction exists at a position determined by the time delay of each sampling pulse. One of a group of acoustic digital pulse trains is then generated uniquely corresponding to the interaction position and is then extracted from the piezoelectric medium as the electromagnetic digital output.

3 Claims, 2 Drawing Figures

METHOD OF AND APPARATUS FOR ANALOG TO DIGITAL CONVERSION UTILIZING ACOUSTIC WAVES

FIELD OF THE INVENTION

The present invention relates generally to digital systems and more particularly to a method of and apparatus for converting analog to digital data utilizing acoustic waves.

BACKGROUND OF THE INVENTION

In recent years digital systems have been explored for a wide variety of communications. Initially, the analog information, such as a voice telephone channel, must be periodically sampled to provide conversion to digital data. After such conversion, the digital data, normally in the form of a binary code, can be transmitted on a microwave link so as to be substantially impervious to interference.

However, in spite of this considerable advantage, the present cost of analog to digital converters is such that the well known and relatively simple transmission of the analog information over copper wires is still predominantly utilized for short communication links.

In addition to lower cost, it is obviously desirable that the analog to digital converter be fast and relatively simple and prior systems have been less than optimum in operation as well as fabrication.

SUMMARY OF THE PRESENT INVENTION

Accordingly, it is the general objective of the present invention to provide a method of and apparatus for analog to digital conversion utilizing acoustic waves to provide a simple and inexpensive converter, but one whose power requirements are relatively low, whose speed is high and furthermore whose information handling capabilities are considerable. Briefly, such objective is achieved by initially generating two time-correlated sequences of electromagnetic pulses. One pulse sequence, which shall be denominated the reference pulses, preferably constitutes a series of identical pulses of radio frequency energy (e.g. 100 MHz) and a pre-determined time order. In turn, the second sequence of pulses, which shall be denominated the sampling pulses, also constitute pulses of radio frequency energy individually of the same duration and at a radio frequency which may be the same or different from the frequency of the reference pulses. The sampling pulses are generated in a time order which is correlated with the reference pulses but are individually compared with the instantaneous value of an input analog signal so as to be delayed in time in an amount which is proportionate to such instantaneous value. For example, if the analog signal constitutes an amplitude-modulated signal, the delay of each sampling pulse will be in direct proportion to the instantaneous amplitude of the sampling pulse so that a direct correlation of the analog signal amplitude and the time delay of the sampling pulse is achieved. Such time delay can be achieved with a simple electronic circuit and corresponding time delays in sampling pulses can be envisioned by those skilled in the art as correlated with variations in frequency or other analog signal parameters.

Both the reference pulses and the time-delayed sampling pulses are introduced by suitable input transducers into a piezoelectric medium so as to generate acoustic waves in a fashion such that translation of the reference and sampling pulses occurs. When an individual reference pulse "overlaps" or, in other words, achieves phase coherence with an individual sampling pulse as a result of the mentioned translation of the acoustic waves, nonlinear parametric interaction of the two wave pulses establishes electric polarization within the piezoelectric medium which is directly proportional to the product of the strain amplitudes of the two acoustic waves in a manner that is now well established. It will be clear that the precise position in the piezoelectric medium where such parametric interaction or coupling occurs will vary dependent upon the amount of time delay of the sampling pulse and such unique position of the interaction is, in turn, utilized to excite a particular one of a series of output transducers of known design which are excited by the mentioned electric polarization at the particular position of overlap.

The output of each transducer is, in turn, arranged to excite in the same piezoelectric medium a spatially distinct set of one or more transducers that are physically arranged on the piezoelectric medium to generate a unique train of acoustic pulses in a selected digital code which in its most simple form will constitute a binary code, and the unique train of acoustic pulses will correspond to the digital "bits".

Accordingly, the sequential parametric interaction of each pair of reference pulse and the corresponding time-delayed sampling pulse will generate trains of digitally coded pulses with each pulse train being uniquely related to the time delay of the respective sampling pulse and accordingly ultimately to the instantaneous amplitude or other instantaneous value of the input analog signal.

A common output transducer is arranged on the piezoelectric medium to receive the sequence of coded pulse trains that convert the same to an electromagnetic digital sequence of pulses which constitute the ultimate digital output of the arrangement.

BRIEF DESCRIPTION OF THE DRAWINGS

The stated objective of the invention and the manner in which it is achieved as summarized hereinabove will be more readily understood by reference to the following detailed description of the exemplary embodiment of the invention shown in the accompanying drawings wherein.

DETAILED DESCRIPTION OF THE EXEMPLARY EMBODIMENT OF THE INVENTION

Figure 2:
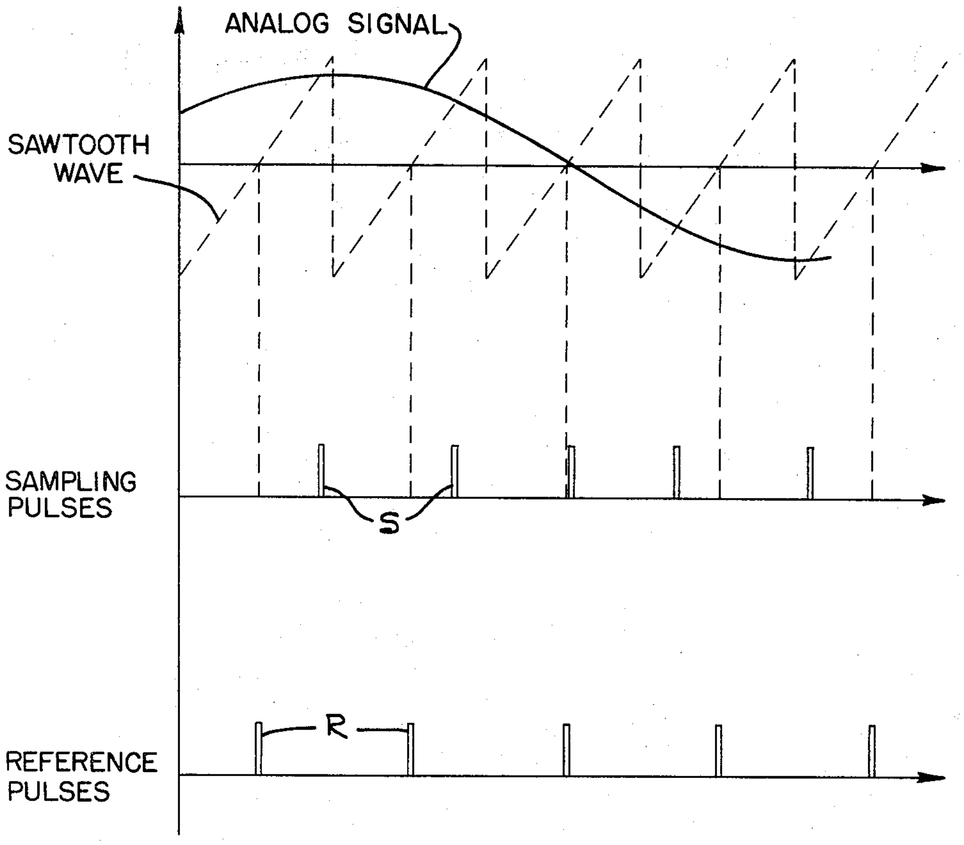

Initially, in accordance with the present invention, time-correlated sequences of reference electromagnetic pulses R and sampling electromagnetic pulses S are generated as indicated graphically in FIG. 2, and, by way of example, such time-correlation of the two sequences of pulses can readily be achieved by utilizing a common sawtooth generator 10 to initiate both sequences. More particularly as shown in block diagram the output of the sawtooth generator 10 is delivered to a single shot multi-vibrator 12 to generate a series of short pulses at regular time intervals that are in turn delivered to a conventional radio frequency signal generator 14 to produce a series of identical radio frequency reference pulses R, for example at 100 MHz. The precise frequency is not critical nor is the length of the individual radio frequency pulse but a relatively short length pulse (e.g. 50 nanoseconds) is preferred to maximize the overall digital capacity of the entire system.

As indicated in FIG. 2, the reference pulses are generated by the multi-vibrator 12 when the sawtooth wave reaches a predetermined amplitude and a simple adjustment of the firing level of the multi-vibrator will enable the sequence of pulses to be advanced or delayed in time as needed.

A corresponding output of the sawtooth generator 10 is also delivered to an electronic comparator 16 together with the input analog signal which, as indicated in FIG. 2, in the present instance constitutes a simple amplitude-modulated wave which is compared with the sawtooth wave in the comparator 16 so as to energize another multi-vibrator 18 when the instantaneous amplitude of the analog signal is equated to that of the sawtooth wave. A comparator such as described in the article "Chip Comparator Keeps Pace With ECL" in *Electronics*, June 19, 1972 can be utilized.

Accordingly, the time delay of the generated sampling pulse S is in proportion to the instantaneous amplitude of the analog signal, the various time delays of the sampling pulses S that are generated being indicated in FIG. 2, and particularly in their time-correlation with the previously described reference pulses R. The sampling pulse multi-vibrator in turn controls a radio frequency signal generator 20 which preferably produces pulses that are identical in duration to the reference pulses and at a frequency which is identical to that of the described reference pulses.

Figure 1:
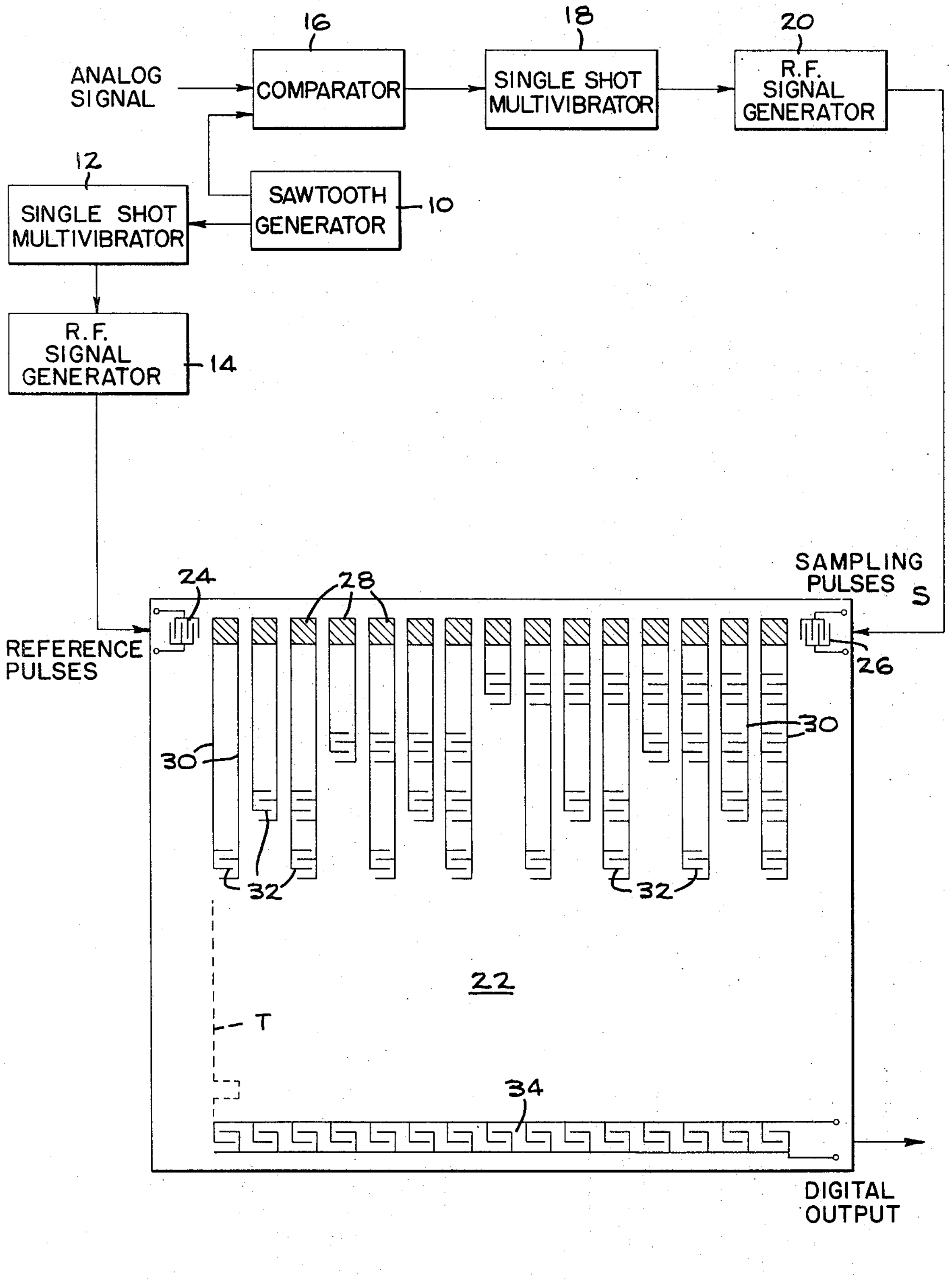
FIG. 1 constitutes a diagramatic illustration of an analog to digital converter embodying the present invention, and FIG. 2 constitutes a composite graph illustrating certain functional aspects of the FIG. 1 arrangement.

The sequence of reference pulses R and sampling pulses S are applied to a piezoelectric medium 22 such as lithium niobate or bismuth germanium oxide in a fashion so that translation of the time-correlated pairs of reference and sampling pulses occurs. More particularly, as shown in FIG. 1, the reference pulses R are applied by a suitable interdigital transducer 24 which is only diagramatically indicated herein but which preferably is of the type described in detail in an article "Design of Surface Wave Delay Lines with Interdigital Transducers" IEEE Transactions on Microwave Theory and Techniques, Vol. MTT–17, No. 11, November 1969, pages 865–873, so as to generate a surface acoustic wave which propagates along a predetermined path to the right and in turn the sampling pulses are applied by a similar transducer 26 to the opposite end of the piezoelectric medium so as to generate surface acoustic wave pulses which propagate to the left along the same path. While these transducers produce acoustic wave pulses which propagate as surface waves, it is to be expressly understood that it is well within the skill of those in the art to apply the electromagnetic energy so that the waves constitute volume waves rather than surface waves without any departure from the spirit of the invention.

The opposite propagation of the sampling and reference acoustic pulses provides the translation thereof mentioned hereinabove but it is to be understood that acoustic waves can also be introduced at the same end of the piezoelectric medium 22, for example, as distinct longitudinal and shear waves to provide another form of translation.

If a single pair of reference and sampling pulses are delivered to the two described transducers 24, 26 so as to propagate in opposite directions, it will be apparent that an overlap or more precisely a phase coherence of the two radio frequency pulses will exist at a particular position on the piezoelectric medium 22 which will vary dependent upon the actual amount of time delay of the individual sampling pulse which of course is in turn determined by the sampled instantaneous amplitude of the input analog signal in the manner previously described.

Accordingly, in accordance with the present invention, a series of output transducers 28 are positioned along the common path of the two oppositely propagating acoustic waves at regularly spaced intervals so that one or the other of these output transducers will be energized depending upon the precise time relationship of the particular pair of sampling and reference pulses. More particularly, the two acoustic wave pulses are parametrically coupled within the piezoelectric medium at a particular position by the simple observation of the conditions for such parametric coupling that is, phase-matching and frequency conservation. Briefly, phase-matching requires that $k_3 = k_1 - k_2$ and frequency conservation in turn requires that $\omega_1 + \omega_2 = \omega_3$, such conditions having been explained for acoustic surface waves briefly in the Luukkala-Kino article "Convolution and Time Inversion Using Parametric Interactions of Acoustic Surface Waves"; Appl. Phys. Letters, Vol. 18, No. 9, May 1, 1971, and in detail in Chapter 5 of W. H. Louisell, "*Coupled Mode and Parametric Electronics*", 1960. In the present instance where the reference and sampling pulses are at the same frequency, the frequency conservation condition indicates that $\omega + \omega = 2\omega$ so that the frequency of the parametrically-coupled pulses is doubled in the form of the produced electric polarization in the piezoelectric medium 22 and because of the opposite propagation of the two pulses $k_1 + (-k_2) = 0$ so that there is no spatial variation in such electric polarization. In such instance, each of the spaced output transducers from the piezoelectric medium, for example, is constituted by two thin metal gold films applied to the upper and lower surfaces of the medium, such as the type described in the mentioned Luukkala-Kino article, or the semiconductor type described in the article by Lee and Gunshor "Enhancement of Nonlinearity in Surface-Acoustic-Wave Propagation from Coupling to Charge Carriers"; Appl. Phys. Letters, Vol. 20, No. 8, Apr. 15, 1972. If the reference and sampling pulses are at different frequencies with different propagation vectors, obviously a spatial variation in the output energy will exist and rather than the prescribed thin films, a coarse pitch interdigital transducer can be utilized for each of the series of output transducers.

Each of the described individual output transducers 28 is electrically connected by conductors 30 to excite one or more unique coding transducers 32 that generate acoustic surface waves that propagate at right angles to the propagation path of the reference and sampling pulses. In the present instance, for purposes of simplification 15 output transducers 28 are shown in FIG. 1 and are arranged to excite coding transducers 32 corresponding to a 4-bit binary code with 16 levels. For example, the left output transducer 28, when energized, will excite a single interdigital coding transducer 32 which will introduce a unique acoustic wave train to the piezoelectric medium 22 in a predetermined position so that the output will constitute a coded pulse train equivalent to the binary coding 0001 as shown in dotted lines at T. The next output transducer 28 will, in turn, excite a coding transducer 32 to provide a coded pulse train equivalent to 0010 and so on following the general binary notation. The coded pulse trains T are delivered downwardly as shown in FIG. 1 as acoustic pulses which will in turn be picked up by one section of a common output transducer 34 which reconverts the acoustic energy into electromagnetic form to provide the ultimate digital output of the mechanism.

While the illustrated structure is relatively simple for purposes of illustration showing only 4-bit binary code with 16 levels, the present state of the art in acoustic surface wave devices indicates that for example an 8-bit code with 256 levels could be placed on a piezoelectric surface which is but a few centimeters on the side. Furthermore, since acoustic waves travel at a relatively slow velocity (approximately $3 \times 10^5$ cm/sec.) and a wrap-around acoustic delay line of the type disclosed in the co-pending patent application of Herbert J. Shaw entitled "Circulating Acoustic Surface Wave Device" U.S. Pat. Application Ser. No. 122, 734, has enabled the attainment of 20 milliseconds of delay on a single crystal of bismuth germanium oxide and a bandwidth of 16 MHz within a central acoustic frequency of 100 MHz, approximately 500,000 pulses or bits could be readily handled, much greater than the present requirements. The described type of surface acoustic wave operation will have a minimal power requirement of no more than 20 microwatts per bit, and, in terms of speed, the converter of the type generally described herein is capable of handling 32 megabits per second which compares most favorably with any of the prior systems.

It will be apparent that many modifications can be made in the structures described without departing from the spirit of the invention. For example, acoustic amplification can be incorporated in the device if necessary and as previously indicated volume waves can be utilized rather than the described acoustic surface waves. Accordingly the foregoing description of one embodiment is to be considered as purely exemplary and not in a limiting sense and the actual scope of the invention is to be indicated only by reference to the appended claims.

What is claimed is:

1. An analog to digital converter which comprises means for generating a series of reference electromagnetic pulses, means for generating a correlated series of sampling pulses, each of which is time-delayed an amount proportional to the instantaneous value of an analog signal, a piezoelectric medium, transducer means for applying said reference pulses and said sampling pulses to said medium to generate pulsed acoustic waves for propagation along a common path in a fashion such that translation of the waves occurs, a plurality of output transducers at spaced intervals along the common propagation path for excitation by coupled waves, the particular output transducer excited being determined by the time delay of each sampling pulse, a plurality of acoustic code transducers in spaced positions on said medium and connected respectively to said output transducers so as to generate unique coded acoustic signal waves for propagation along different paths which are different from said common path, and output transducer means for receiving the coded acoustic signal waves generated by all of said coded transducers associated with said particular excited output transducer.

2. An analog to digital converter which comprises means for generating a series of reference electromagnetic pulses, means for generating a correlated series of sampling pulses, each of which is time-delayed an amount proportional to the instantaneous value of an analog signal, a piezoelectric medium, a first transducer for applying said reference pulses to said medium for propagation as pulsed acoustic waves along a predetermined path, a second transducer for applying said time-delayed sampling pulses to said medium for propagation as pulsed acoustic waves along the same predetermined path in a fashion to provide translation of the two waves, a plurality of third transducers at spaced intervals along the common propagation path arranged for excitation by coupled waves, the particular transducer excited being determined by the time delay of each sampling pulse, and acoustic code transducers in spaced positions on said medium and connected to said third transducers to generate unique coded acoustic signals for propagation along different paths which are different from said common path, and a group of commonly-connected output transducers for receiving the coded acoustic waves generated by said code transducers.

3. An analog to digital converter according to claim 2 wherein said delayed sampling pulse generating means includes a sawtooth generator, a comparator arranged to receive the output of said sawtooth generator and an analog signal and generate signal pulses at times determined by the instantaneous amplitude of the analog signal.

* * * * *